United States Patent
Levi et al.

(10) Patent No.: US 9,207,945 B2
(45) Date of Patent: Dec. 8, 2015

(54) MULTI-PERSONA COMPUTING BASED ON REAL TIME USER RECOGNITION

(71) Applicant: Intel Corporation, Santa Clara, CA (US)

(72) Inventors: Shachaf Levi, Zichron Yaacov (IL); Omer Ben-Shalom, Rishon Le-Tzion (IL)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 13/630,076

(22) Filed: Sep. 28, 2012

(65) Prior Publication Data

US 2014/0095852 A1    Apr. 3, 2014

(51) Int. Cl.
G06F 9/44    (2006.01)
G06F 21/00    (2013.01)
G06F 9/445    (2006.01)

(52) U.S. Cl.
CPC ............ *G06F 9/44* (2013.01); *G06F 9/4451* (2013.01); *G06F 21/00* (2013.01)

(58) Field of Classification Search
CPC ...................... G06F 9/44505; G06F 9/4451
USPC ........................................... 713/1, 100
See application file for complete search history.

(56) References Cited

U.S. PATENT DOCUMENTS

| | | | |
|---|---|---|---|
| 8,600,355 B1 * | 12/2013 | Sadhvani et al. | 455/411 |
| 8,694,522 B1 * | 4/2014 | Pance | 707/758 |
| 2010/0293543 A1 * | 11/2010 | Erhart et al. | 718/1 |
| 2013/0160141 A1 * | 6/2013 | Tseng et al. | 726/28 |
| 2013/0263237 A1 * | 10/2013 | Kumaraswamy | 726/7 |

\* cited by examiner

*Primary Examiner* — Albert Wang
(74) *Attorney, Agent, or Firm* — Jordan IP Law, LLC (57) ABSTRACT

A computing device may configure one or more applications on the computing device for a specific user in response to identifying that the specific user is operating the device and may make relevant content available to such applications. The identification of the specific user may be performed using a signal from one or more user identification sensors.

20 Claims, 10 Drawing Sheets

MULTI-PERSONA COMPUTING BASED ON REAL TIME USER RECOGNITION

BACKGROUND

Many electronic computing devices may be shared by multiple users, wherein different users of a device may have preferred configurations of applications on the electronic computing device. Additionally, different users of a device may have private data and/or applications that they do not wish to share with the other users of the electronic computing device. For example, a family may have a computer that is shared between adults and children. The children may enjoy playing games, visiting websites for young audiences, enjoying media content attractive to young audiences, and/or the like. The adults, on the other hand, may use the system to read news, perform accounting, watch movies in the evening, and/or the like. Each time the operator of the computer changes, users may interrupt another person's configuration. For example, if a first user is watching a movie and decides mid-movie to let a second user use the computer, the second user may close the movie application or interrupt the location of the movie that the first user was watching. When the first user returns, she may need to set up the movie application again to where she was before the second user interrupted the movie. Furthermore, the new operator of the computer may well be exposed to content from a previous user that is not suitable or permissible to them due to age, occupation or preferences.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments of the present invention may enable multiple users to share a computing device with individual configurations. Specifically, embodiments of the present invention automatically reconfigure a computing device for a specific user based upon an automatic detection that the operator of the device is the specific user. Awareness that a device is being operated by a specific user is referred to in this disclosure as "persona aware." In some of the various embodiments, "persona aware" is also detects a specific user operating a device in a specific context, such as at home or at work.

Figure 1A:
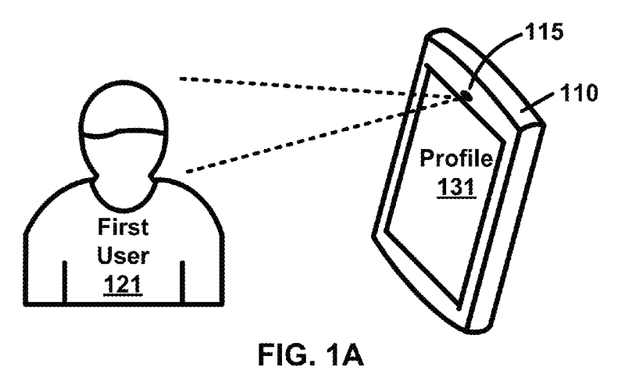
FIG. 1A through FIG. 1C illustrate two users sharing a computing device as per an aspect of an embodiment of the present invention.
Figure 1B:
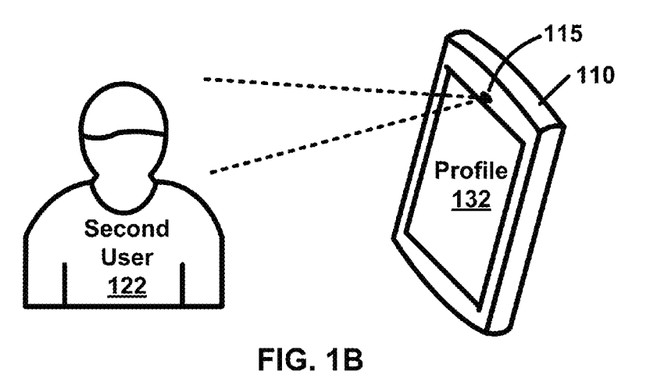
Figure 1C:
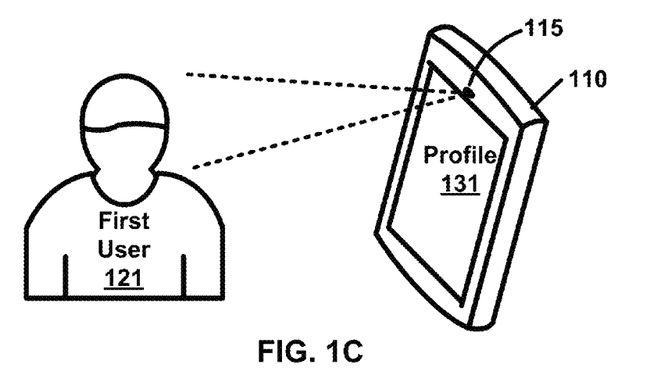

FIG. 1A through FIG. 1C illustrate two uses (121 and 122) sharing a computing device 110 as per an aspect of an embodiment of the present invention. In FIG. 1A, a first user 121 is operating electronic device 110. The first user 121 may have a personal configuration for applications and/or the like on computing device 110 (represented in this figure as profile 131). While working on device 110, one or more sensors 115 may be collecting information that may be used to identify the user of device 110.

After a while, the operator of electronic device 110 may change from the first user 121 to a second user 122. The sensor(s) 115 may be used to determine that the user of the device has changed from the first user 121 (as illustrated in FIG. 1A) to the second user 122 (as illustrated in FIG. 1B). In response to this change, device 110 may change to a second configuration (represented in this figure as profile 132) that reflects the personal configuration of applications and/or the like on computing device 110 for the second user 122. Additionally, the state of the applications associated with a profile 131 may be stored for later use.

Sometime later, the operator of electronic device 110 may change again from the second user 122 back to the first user 121. The sensor(s) 115 may again be used to determine that the user of the device has changed from the second user 122 (as illustrated in FIG. 1B) to the first user 121 (as illustrated in FIG. 1C). In response to this change, device 110 may change back to the first configuration (represented in this figure as the profile 131). Additionally, the state of the applications associated with profile 132 may be stored for later use. In some of the various embodiments, the profile 131 and/or the state of the machine associated with the profile 131 may be used to restore the applications and/or their state to when the first user 121 passed the device to second user 122.

In several of the embodiments, detection of a user includes the identification of a user in a contextual realm. For example, a person detected using a device at work may be identified as one user, whereas, the same person detected using the device at home may be identified as a second user. This context aware identification may be referred to as a "persona." Therefore, some of the various embodiments may not only detect one user passing the device to another user, but also detect a single user, for example, moving from a 'personal' persona to a 'work' persona or from one type of 'work' persona to a different 'work' persona. For example, if a person works on multiple projects, the system may switch the computing environment when switching from one persona to another persona.

Figure 2:
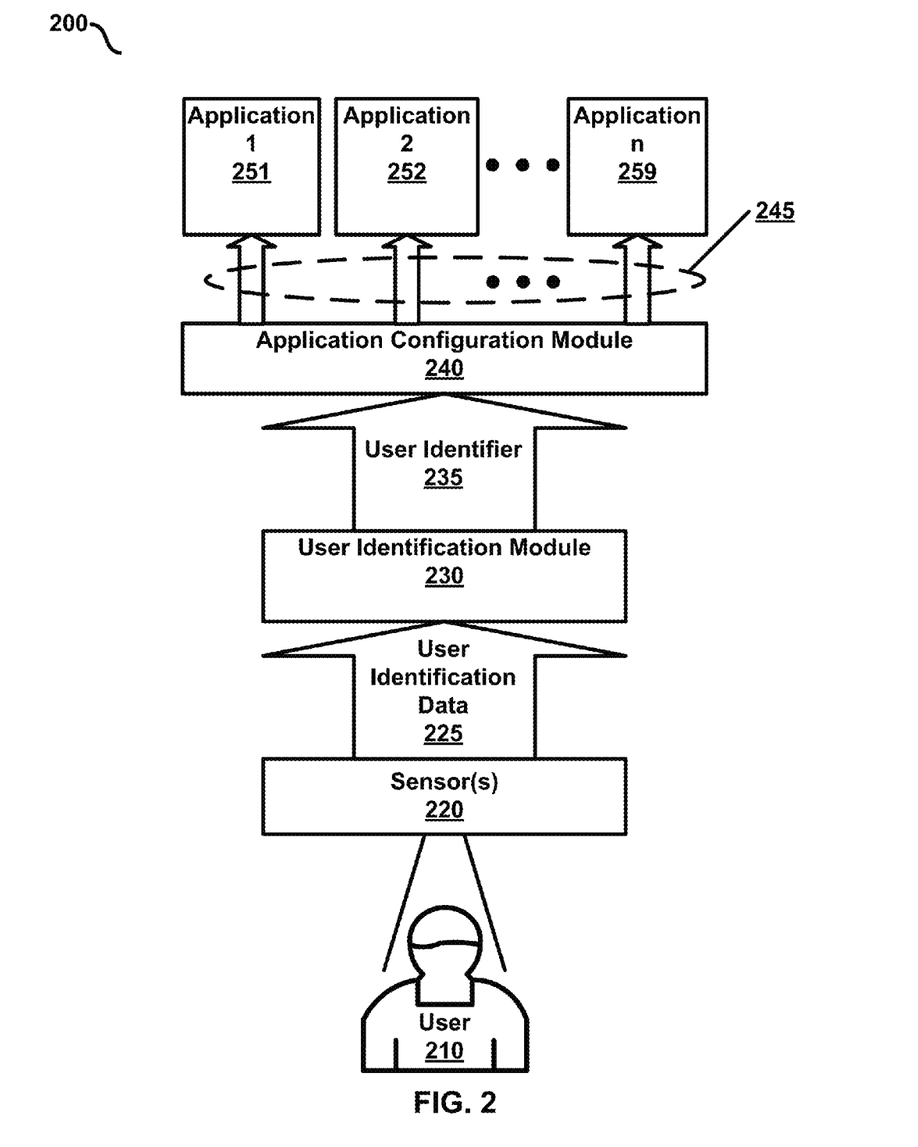
FIG. 2 through FIG. 8 are block diagrams of multi-persona computing mechanisms as per embodiments of the present invention.

FIG. 2 is a block diagram of a multi-persona computing mechanism 200 as per an aspect of an embodiment of the present invention. Embodiments of the multi-persona computing mechanism 200 may be implemented in many forms that employ hardware, machine instructions in combination with hardware, and/or the like. Some of embodiments may include one or more user identification sensors 220, a user identification module 230 and an application configuration module 240. The multi-persona computing mechanism 200 may be implemented in an electronic device such as a smart phone, a computing tablet, a computer, and/or the like. Basically, embodiments of the multi-persona computing mechanism 200 may be employed with (or as part of) a device which is electronically reconfigurable.

User identification sensors 220 may identify a specific user 210 by collecting user identification data 225 that represents characteristics of the person 210. In many embodiments, the user identification sensors 220 may collect user identification data 225 using an identification device reader such as a radio frequency identification tag reader, a smart card reader, or any other hardware device that a system may use to identify a user and/or provide assurance of truthfulness in an identity assertion (e.g., Yubi key available from Yubico Inc. of Palo Alto, Calif.). User identification data 225 may also include information collected about the user 210 using a device such as a biometric sensor, a face recognition sensor, a behavioral analysis sensor, and/or the like. In many embodiments, the user identification sensors 220 may involve hardware such as a camera, a microphone, a fingerprint reader, a palm reader, a retinal scanner, a smart card reader, a face recognition system, a voice recognition system, a DNA analysis system, a behavior analysis system, and/or the like. Basically, the sensors 220 may be configured to collect and analyze information that may be used to determine the identity of the user of an electronic device.

According to some of the various embodiments, a user identification module 230 may be used to identify a specific user 210 based on a signal from at least one of the one or more user identification sensors 220. The signal may include user identification data 225. The user identification module 230 may process (or further process) the user identification data 225. For example, the user identification module 230 may perform facial recognition analysis using user identification data 225 obtained from a camera sensor to identify a specific user 210. Similarly, the user identification module 230 may perform voice recognition analysis using the user identification data 225 obtained from a microphone to identify a specific user 210. In yet another example, the identification module 230 may perform a timing analysis using the user identification data 225 obtained from a keyboard to identify a specific user 210 through their characteristic typing style.

In some of the various embodiments, the sensors 220 and the user identification module 230 may be integrated. In other words, the sensors 220 and the user identification module 230 may comprise an identification system that produces a user identifier 235 associated with user 210. An example integrated system may include a biometric identification system, a non-biometric identification system, and/or the like.

Biometric identification system(s) measure different aspects of human physiology, chemistry or behavior for biometric identification (and/or authentication). The selection of a particular biometric for use in a specific application may involve weighting several factors. The biometric identification system may need to measure a trait that a user of the electronic system should possess. The trait should be sufficiently different for individuals who may use the electronic device may be distinguished from one another. Some traits may vary over time. Therefore, a trait may be monitored that will be reasonably invariant over time with respect to a matching mechanism. The biometric system may collect data related to traits that are measurable. It is envisioned that the measured traits may expand over time as technology evolves and that sensors 220 to measure these new traits may be employed as described herein.

A biometric system may operate in a verification mode where the system performs a one-to-one comparison of a captured biometric with a specific template stored in a biometric database in order to verify the individual's identity. "Positive recognition" may be used as a verification mode to prevent multiple people from using same identity.

A biometric system may operate in an identification mode where the system may perform a one-to-many comparison against a biometric database in attempt to establish the identity of an unknown individual. The system may succeed in identifying the individual if the comparison of the biometric sample to a template in the database falls within a previously set threshold. An identification mode may be used either for 'positive recognition' (so that the user does not have to provide any information about the template to be used) or for 'negative recognition' of the person where the system establishes whether the person is who she (implicitly or explicitly) denies to be.

A user such as user 210 may need to enroll in the biometric system the first time an individual uses the biometric system. During this enrollment, biometric information from the user 210 may be captured and stored. In subsequent uses, biometric information may be detected and compared with the stored information. Depending on the electronic system, the storage and retrieval of the biometric data may be secured. The sensor(s) 220 may be the interface between the real world and the system and may be tasked to acquire the user identification data 225. The sensors 20 may be selected according to the biometric trait. For example, if the biometric trait is a face, the sensor 220 may include an image acquisition sensor (and/or system). The sensor 220 and/or user identification module 230 may be tasked with pre-processing tasks such as removing artifacts from the sensor, enhancing the input (e.g. removing background noise), normalizing the sensed data, and/or the like. The sensor 220 and/or user identification module 230 may extract identification features. The extracted features may be analyzed for an identification match. For example, extracted features may be compared against a template of known features for different users. A template may be a synthesis of the relevant characteristics extracted from the source. Elements of the biometric measurement that are not used in a comparison mechanism may be discarded in the template to reduce the file size and to protect the identity of the enrollee.

A determination of an active user 210 of the system may performed by estimating a distance between the extracted features and the template features using a technique such as a Hamming distance algorithm or the like.

Selection of a biometric sensor(s) 220 may depend upon characteristic measurements and user requirements. Considerations may include performance, acceptability, circumvention, robustness, population coverage, size, identity theft deterrence in selecting a particular biometric. Selection of biometrics may also consider sensor availability, device availability, computational time and reliability, cost, sensor area and power consumption.

In some of the various embodiments, multi sensor 220 biometric system may be used. Multi sensor 220 biometrics may fuse information obtained from different sensors 220 to overcome the limitations of single biometric sensor 220 systems. Multi sensor 220 biometric systems may operate in different modes such as a serial mode, a parallel mode, a hierarchical mode, a pipelining mode, a sequential mode, and/or the like. Factors from diverse sensors may effectively be combined to increase the probability of making a correct match. For example, a system with a camera and a microphone, may perform both facial recognition and voice recognition. User determinations from each of the recognition techniques may be weighted given a confidence weighting. In cases of conflicting user determinations, the confidence weighting may be used to determine which sensor is providing the most accurate user determination and that determination may be used to generate the user identifier 235.

Application configuration module 240 may configure one or more applications 251 through 259 for identified user 210 based upon the user identifier 235. The user identifier 235 may provide information to application configuration module 240 as to the current user 210 of the system 200. The application configuration module 240 may communicate the user information to application(s) 251-259. The user identifier 235 may be communicated to application configuration module 240 at various times such as: on a periodic basis, when the user changes, by request, and/or the like.

In some of the various embodiments, the application configuration module 240 may store configuration information for one or more of the applications 251-259. In this case, the application configuration module 240 may communicate the configuration information to application(s) 251-259 through a link 245. In yet other embodiments, applications 251-259 may store the configuration information. In these embodiments, the link 245 may communicate the user information to applications 251-259.

In yet other embodiments, the application configuration module may communicate information over the link 245 to applications with sequences of instructions that will configure the application for the specific user 210. These instructions may be application specific. For example, some applications may require detailed configuration instruction, whereas other applications may reconfigure with only a simple instruction.

For some embodiments, there may be multiple instances of the same program, each configured for a different user. When the user changes, the application configuration module 240 may merely deactivate one of the applications and activate the other application. For example, two users of system 200 may both run the same email program but desire to not share their email with each other. The system may activate only one email program at a time, namely the email program that is configured for the current user. In this way, the current user 210 only interacts with her own email application. Similarly, two users of system 200 may both run the same media player while desiring to keep the status of their media player to themselves. The system may activate only one media player at a time, namely the media player that is configured for the current user. In this way, the current user 210 only interacts with her own media player application. So when, for example, when a first user returns to system 200 after a second user has been using the system 200, the first user may continue to enjoy their media content from the point where they last stopped. In yet another embodiment the player application may be a single application instance where the context of the player is switched to match the user. For example, the context may include the file being accessed and the location in that file. This context may be switched when the active user changes, achieving the same end user experience without switching the executing program.

According to some of the various embodiments, application configurations for specific users may vary depending upon determinable factors such as time of day, location, day of the week, holidays, and/or the like. As a time based configuration example, a user may desire a first configuration during work hours and another configuration during evenings and weekends. As a location based configuration example, a user may desire a specific configuration when the device is at a work location and another configuration when the device is at a relaxation location.

Figure 3:
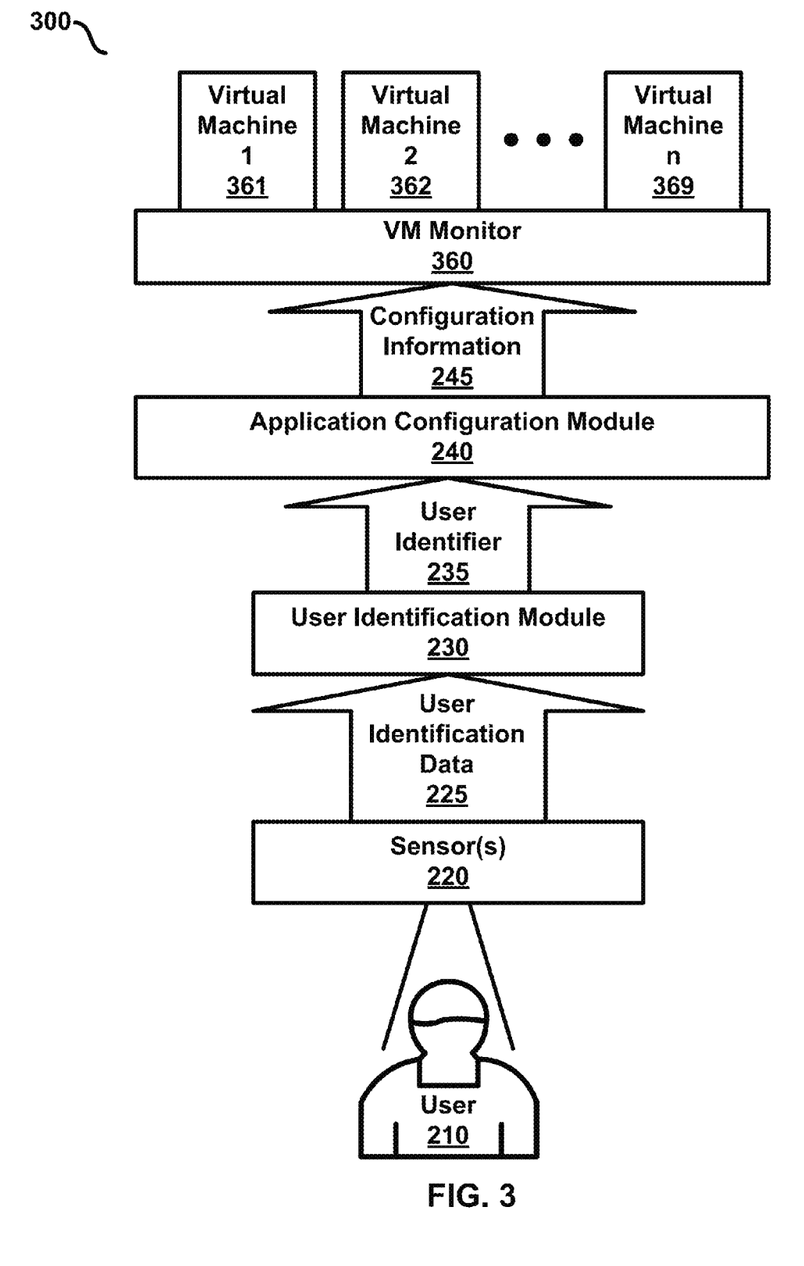

FIG. 3 is a block diagram of a multi-persona computing mechanism 30 as per an aspect of an embodiment of the present invention where configuration changes may be implemented by switching between one or more virtual machines 361-369. As illustrated in this example, application configuration module 240 may communicate configuration information to a virtual machine monitor 360. Some of the virtual machines 361-369 may be configured for a specific user 210. As the user changes, the virtual machine monitor 360 may switch between the virtual machines 361-369 to activate the virtual machine which is configured for the active user 210.

A virtual machine monitor may be a host program that allows a single computer to support multiple execution environments. In some embodiments, all the users see their systems as self-contained computers isolated from other users, even though every user is served by the same machine. In some of the various embodiments, virtual machines may operate inside other virtual machines. In this case, it is possible for multiple users to share a basic machine, however, certain applications may run in a virtual machine in the basic machine. In yet other embodiments, the basic machine may be an underlying operating system and virtual machines may operate as applications under the operating system. In some embodiments, the virtual machine monitor and the operating system may be combined.

Figure 4:
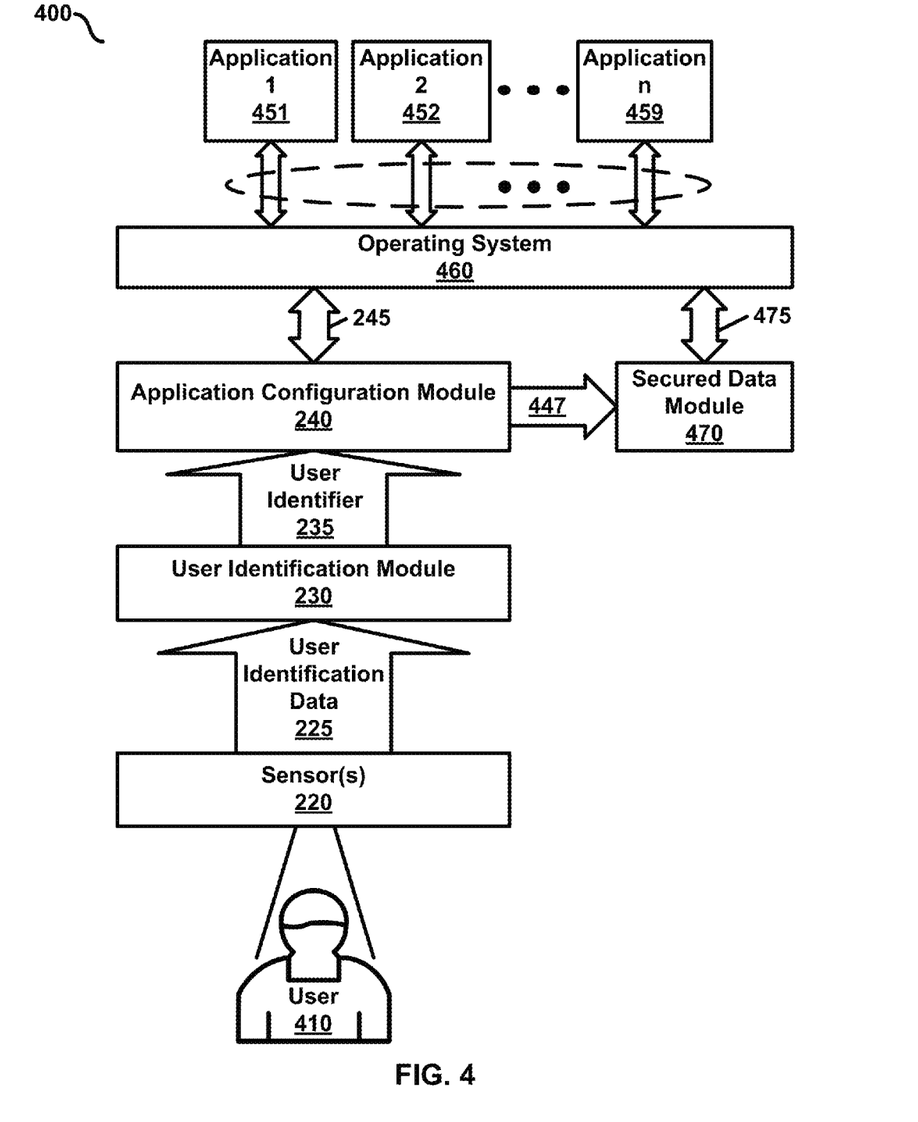

FIG. 4 is a block diagram of a multi-persona computing mechanism as per an aspect of an embodiment of the present invention where configuration changes for applications 451-459 may be managed by an operating system 460. The operating system 460 may be persona aware. When a user of the system initiates application(s) 451-459, the operating system may associate those application(s) 451-459 with the user. When the user changes, the operating system may suspend those applications until the specific user 210 returns. Similarly, the operating system may also associate general configurations with the user and reinstate those configurations whenever the specific user 210 is operating the system. Examples of general configurations may include backgrounds, sound volumes, icon distribution, and/or the like.

Also illustrated in FIG. 4 is an optional secure storage module 470. Whenever a user 210 becomes the user of the system, the application configuration module may communicate user information 447 to the secured data module 470. The secure data module 470 may store private data associated with the some or all of the various users of the system. The secure data module 470 may provide a mechanism for the private data associated with the current user to be accessed over link 475. Secure data module may be implemented using hardware and/or machine instructions in combination with hardware. Some of the secure data module embodiments may include encryption and decryption mechanisms to secure the private data. Some of the secure data module embodiments may include secure data chipsets that include a Manageability Engine (ME). An ME may be a controlled area of a chipset that is tamper-proof and operates in isolation from the operating system for added security. One such ME engine is available from Intel Corp. of Santa Clara, Calif. Algorithms may be implemented that run in the ME, performing the operations that link a computer to a validated application, site, and/or the like and ensure strong authentication.

Figure 5:
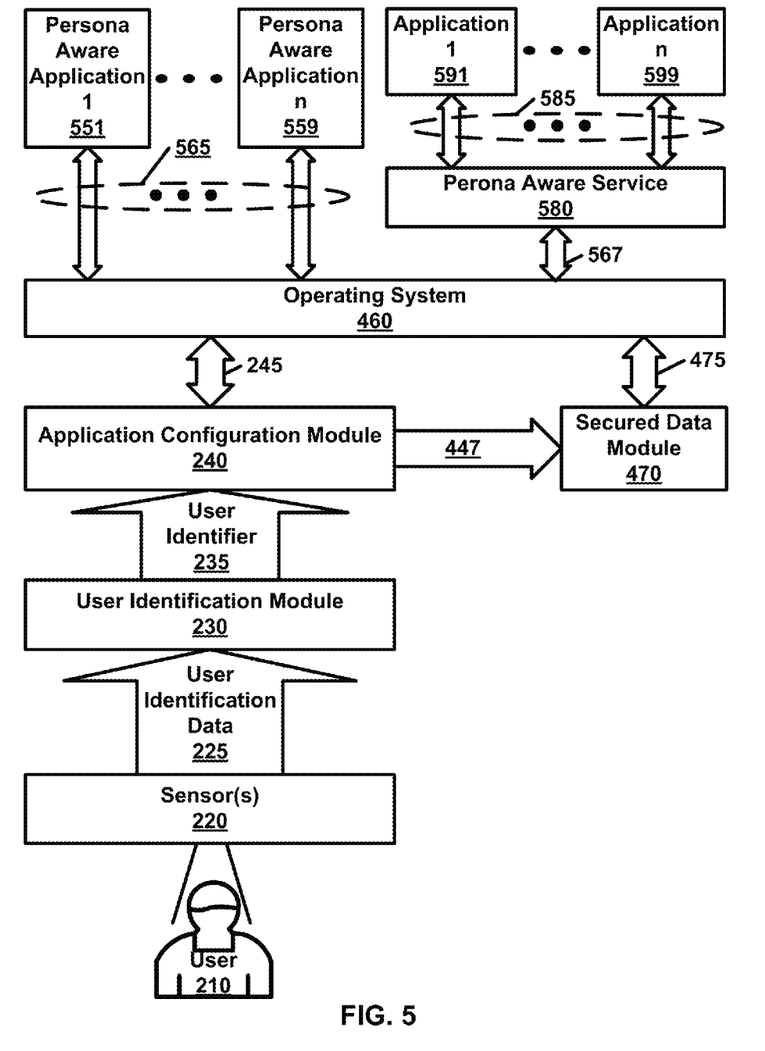

FIG. 5 is a block diagram of a multi-persona computing mechanism as per an aspect of an embodiment of the present invention where some applications 551-559 may be persona aware while some applications 591-599 may not be persona aware.

Persona aware applications 551-559 may be written to reconfigure themselves when informed over links 565 that a change in user has occurred. The persona aware applications may use an application programming interface (API), an application Binary Interface, and/or the like to communicate persona information with the operating system 460. An API may be a specification intended to be used as an interface by software components to communicate with each other. Thus, the API may include specifications for routines, data structures, object classes, and variables. The API specification may take many forms, including an International Standard such as POSIX or vendor documentation such as the Microsoft Windows API, or the libraries of a programming language, e.g. Standard Template Library in C++ or Java API. The API may differ from an application binary interface (ABI) in that an API may be source code based while an ABI may be a binary interface. For instance POSIX is an API, while the Linux Standard Base is an ABI.

The non-persona aware applications 591-599 may operate through a persona aware service 580. In general non-persona aware applications 591-599 may be legacy programs that are not written to operate in a persona aware system. When the operating system 460 receives information that the active user has changed, the operating system 460 may communicate this information over link 567. The persona aware service 580 may keep track of the configurations for the non-persona aware applications 591-599 and effectuate the reconfiguration of the non-persona aware applications 591-599 over links 585 in accordance with the user change information.

Some of the embodiments of the present invention may include a larger system. Example systems, in addition to the components or modules already discussed (e.g. user identification module, application configuration module, and/or the like) may further include components such as input port(s), memory(ies), processor(s), display(s), and/or the like. For example, an input port may provide access to one or more of the user identification sensors 220. A memory may provide for storage of operating system(s), application(s), and/or the like. A processor may provide a mechanism for executing the operating system(s), application(s), and/or the like. A display may present the output from operating system(s), application(s), and/or the like.

FIG. 6-9 are flow diagram of multi-persona computing mechanism as per aspects of various example embodiments of the present invention. The flow diagrams may be implemented using various hardware, machine-readable instructions in combination with hardware, and/or the like. The machine-readable instructions may reside on a non-transitory machine-readable medium. The machine-readable instructions may be configured to execute on programmable hardware such as processors, programmable logic, and/or the like.

Figure 6:
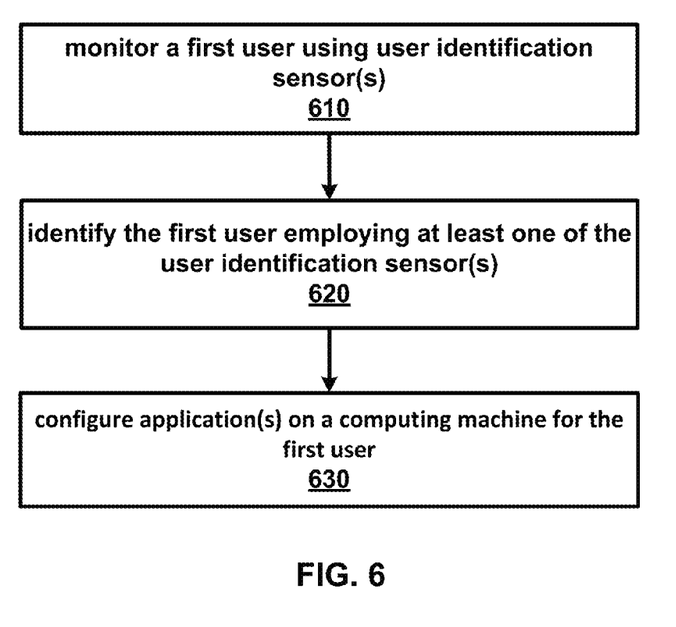

Referring to FIG. 6, a first user may be monitored using signal(s) from one or more user identification sensors at 610. The first user may be identified employing the user identification sensor(s) at 620. Applications in a device may be configured for the first user in response to the identification at 630.

Figure 7:
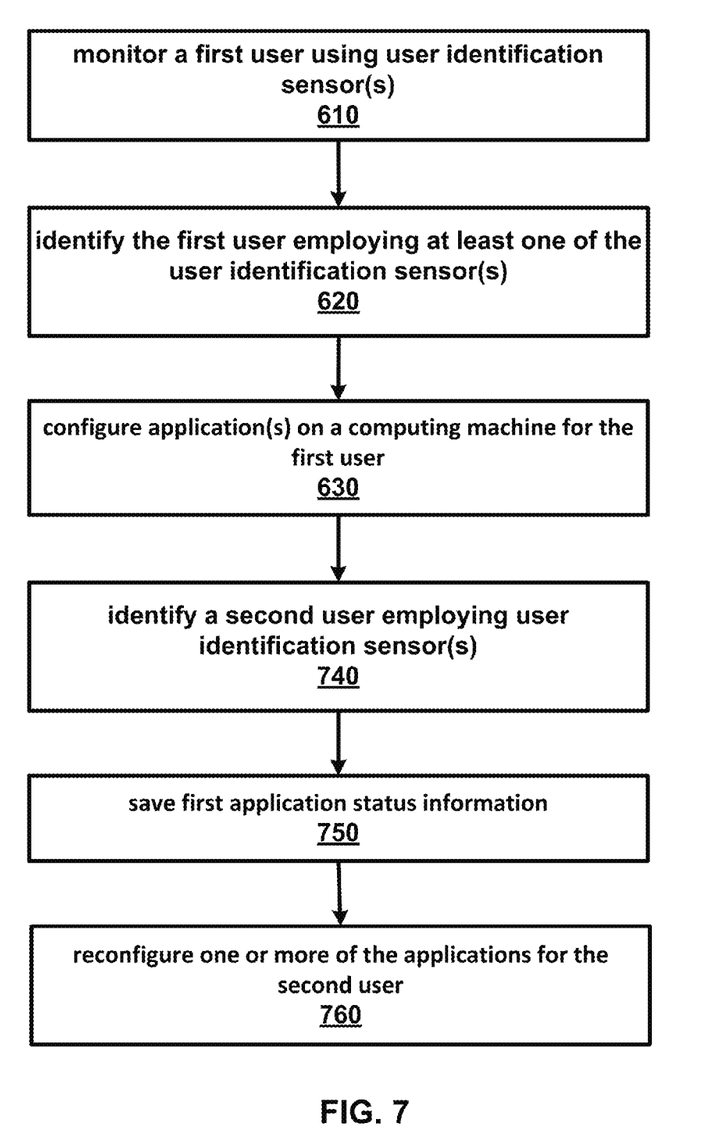

The first user may lend the device to a second user. Referring to FIG. 7, the second user of the device may be identified employing one or more of the user identification sensor(s) at 740. First application status information associated with the applications configured, used, and/or the like for the first user may be saved at 750. Application(s) for the second user may be reconfigured at 760.

Figure 8:
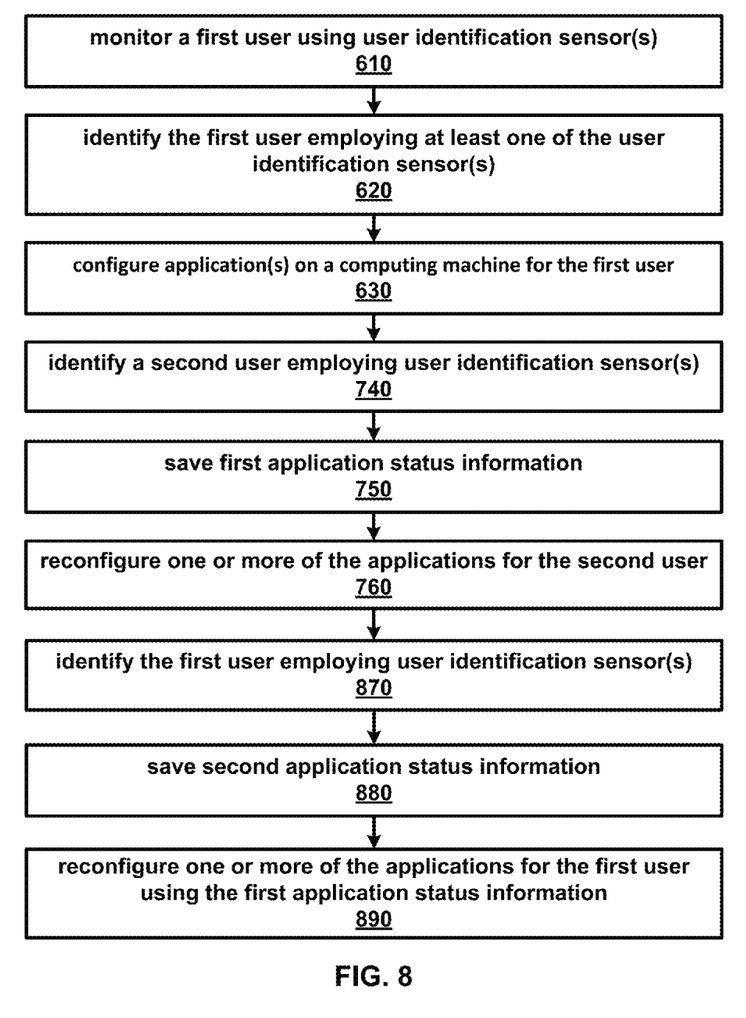

The second user may return the device back to the first user. Referring to FIG. 8, the first user of the device may be identified employing one or more of the user identification sensor(s) at 870. Second application status information associated with the applications configured, used, and/or the like for the second user may be saved at 880. Application(s) for the first user may be reconfigured at 890. Whenever applications are configured for the first user, a first user specific storage may be made available and a second user specific storage may be made unavailable. Similarly, whenever applications are configured for the second user, the second user specific storage may be made available and the second user specific storage may be made unavailable.

Figure 9:
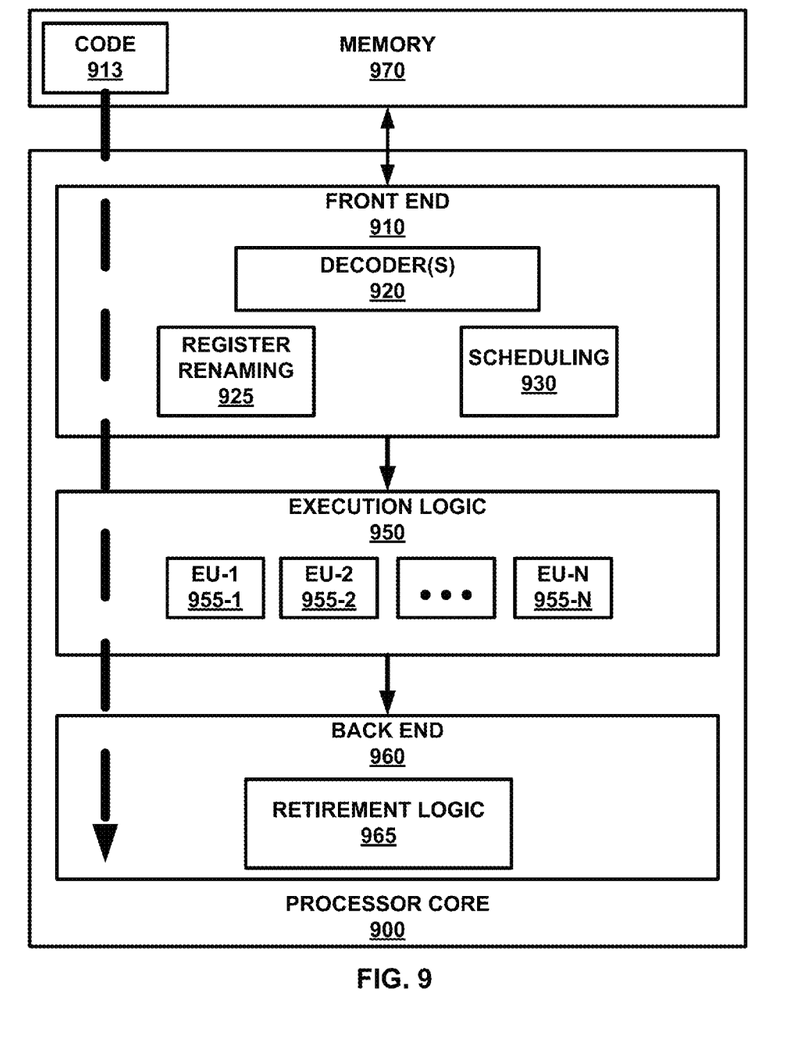
FIG. 9 is a block diagram of an example of a processor according to an aspect of an embodiment of the present invention.

FIG. 9 illustrates a processor core 900 according to one embodiment. The processor core 900 may be the core for any type of processor, such as a micro-processor, an embedded processor, a digital signal processor (DSP), a network processor, or other device to execute code. Although only one processor core 900 is illustrated in FIG. 9, a processing element may alternatively include more than one of the processor core 900 illustrated in FIG. 9. The processor core 900 may be a single-threaded core or, for at least one embodiment, the processor core 900 may be multithreaded in that it may include more than one hardware thread context (or "logical processor") per core.

FIG. 9 also illustrates a memory 970 coupled to the processor 900. The memory 970 may be any of a wide variety of memories (including various layers of memory hierarchy) as are known or otherwise available to those of skill in the art. The memory 970 may include one or more code 913 instruction(s) to be executed by the processor 900 core, wherein the code 913 may implement the logic architecture illustrated in FIG. 6 through FIG. 8, already discussed. The processor core 900 follows a program sequence of instructions indicated by the code 913. Each instruction may enter a front end portion 910 and be processed by one or more decoders 920. The decoder 920 may generate as its output a micro operation such as a fixed width micro operation in a predefined format, or may generate other instructions, microinstructions, or control signals which reflect the original code instruction. The illustrated front end 910 also includes register renaming logic 925 and scheduling logic 930, which generally allocate resources and queue the operation corresponding to the convert instruction for execution.

The processor 900 is shown including execution logic 950 having a set of execution units 955-1 through 955-N. Some embodiments may include a number of execution units dedicated to specific functions or sets of functions. Other embodiments may include only one execution unit or one execution unit that can perform a particular function. The illustrated execution logic 950 performs the operations specified by code instructions.

After completion of execution of the operations specified by the code instructions, back end logic 960 retires the instructions of the code 913. In one embodiment, the processor 900 allows out of order execution but requires in order retirement of instructions. Retirement logic 965 may take a variety of forms as known to those of skill in the art (e.g., re-order buffers or the like). In this manner, the processor core 900 is transformed during execution of the code 913, at least in terms of the output generated by the decoder, the hardware registers and tables utilized by the register renaming logic 925, and any registers (not shown) modified by the execution logic 950.

Although not illustrated in FIG. 9, a processing element may include other elements on chip with the processor core 900. For example, a processing element may include memory control logic along with the processor core 900. The processing element may include I/O control logic and/or may include I/O control logic integrated with memory control logic. The processing element may also include one or more caches.

Figure 10:
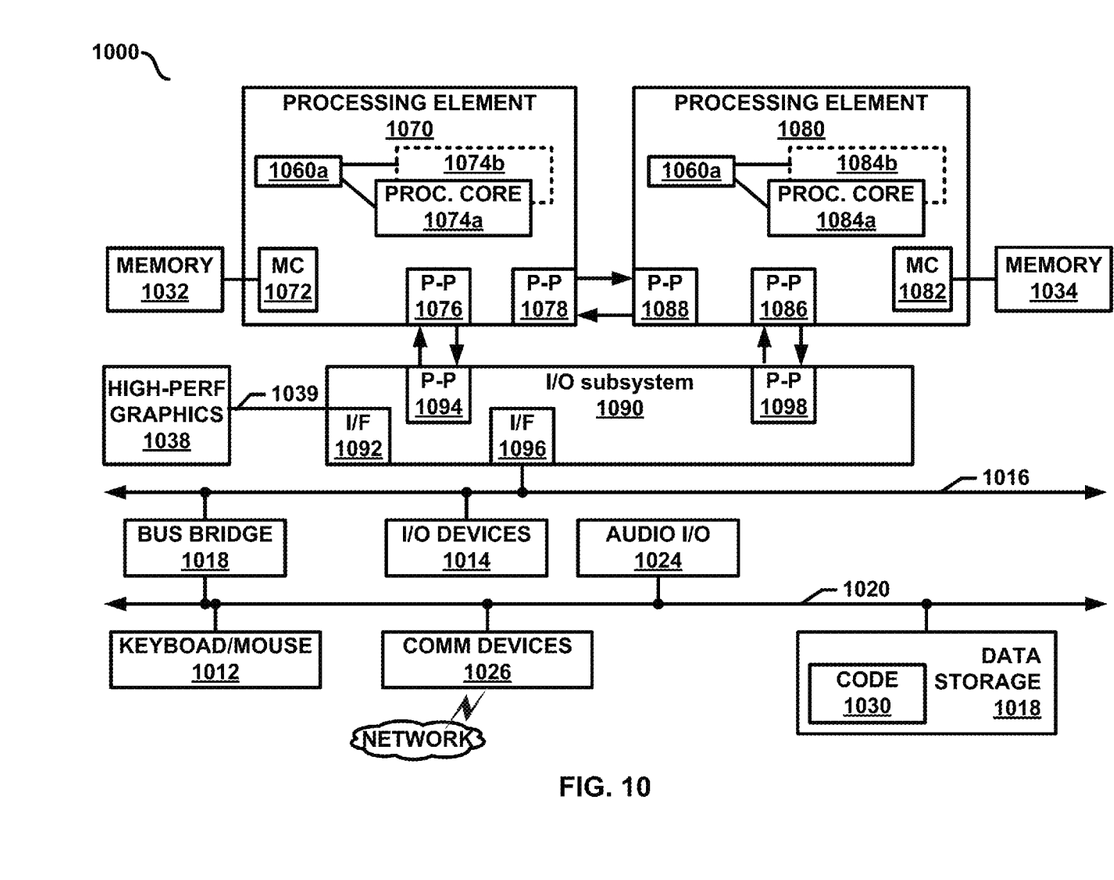
FIG. 10 is a block diagram of an example of a system according to an aspect of an embodiment of the present invention.

Referring now to FIG. 10, shown is a block diagram of a system embodiment 1000 in accordance with an embodiment of the present invention. Shown in FIG. 10 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074*b* and processor cores 1084*a* and 1084*b*). Such cores 1074, 1074*b*, 1084*a*, 1084*b* may be configured to execute instruction code in a manner similar to that discussed above in connection with FIG. 10.

Each processing element 1070, 1080 may include at least one shared cache 1060. The shared cache 1060*a*, 1060*b* may store data (e.g., instructions) that are utilized by one or more components of the processor, such as the cores 1074*a*, 1074*b* and 1084*a*, 1084*b*, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 such as sensor(s) 220 (FIG. 2) may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network, not shown), and a data storage unit 1018 such as a disk drive or other mass storage device which may include code 1030, in one embodiment. The code 1030 may include instructions for performing embodiments of one or more of the methods described above. Thus, the illustrated code 1030 may implement the logic architecture illustrated in FIG. 6 through FIG. 8 and could be similar to the code 1013 (FIG. 10), already discussed. Further, an audio I/O 1024 may be coupled to second bus 1020.

Note that other embodiments are contemplated. For example, instead of the point-to-point architecture of FIG. 10, a system may implement a multi-drop bus or another such communication topology. Also, the elements of FIG. 1 may alternatively be partitioned using more or fewer integrated chips than shown in FIG. 10.

Examples may therefore include a system having an input port to access one or more user identification sensors, a memory for storing an operating system and the one or more applications, a processor to execute at least operating system and at least one of the one or more applications and a user identification module to identify a specific user using at least one of the one or more user identification sensors. The system may also have an application configuration module to configure at least one of the one or more applications for the specific user and a display for presenting the output of at least one of the one or more applications.

Examples may also include an apparatus having one or more user identification sensors and an identification module to identify a specific user based on a signal from at least one of the one or more user identification sensors. The apparatus may also have an application configuration module to configure one or more applications for the specific user.

Examples may also include a method that involves monitoring a first user based on a signal from one or more user identification sensors and identifying the first user employing at least one of the one or more user identification sensors. The method can also provide for configuring one or more applications on a computing machine for the first user.

Examples may also include at least one non-transitory machine-readable medium comprising one or more instructions which, if executed by a processor, cause a computer to monitor a first user using one or more user identification sensors. The instructions, if executed, can also cause a computer to identify the first user employing at least one of the one or more user identification sensors and configure one or more applications on a computing machine for the first user.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, punched cards and paper tapes, optical disks, barcodes, magnetic ink characters and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
    an input port to access one or more user identification sensors;
    a memory for storing an operating system and one or more applications;
    a processor to execute at least operating system and at least one of the one or more applications;
    a context aware user identification module to identify a specific user persona using at least one of the one or more user identification sensors wherein the specific user persona includes the context in which the user operates the system;
    an application configuration module to configure at least one of the one or more applications for the specific user persona, wherein the application configuration module configures at least one of the one or more applications through a persona aware service running in the operating system and wherein at least one of the one or more applications are persona aware;
    a display for presenting the output of at least one of the one or more applications; and
    one or more virtual machines switchable by the application configuration module in response to identification of the specific user persona.

2. The system according to claim 1, wherein the one or more user identification sensors include one or more of a radio frequency identification tag, a smart card, a factor authentication device, a biometric sensor, a face recognition sensor, and a behavioral biometric sensor.

3. The system according to claim 1, wherein the application configuration module interfaces with user specific storage.

4. The system according to claim 1, wherein the application configuration module configures at least one of the one or more applications through an operating system service.

5. An apparatus comprising:
    one or more user identification sensors;
    a context aware user identification module to identify a specific user persona based on a signal from at least one of the one or more user identification sensors wherein the specific user persona includes the context in which the user operates the apparatus;
    an application configuration module to configure one or more applications for the specific user persona, wherein the application configuration module is to configure at least one of the one or more applications through a persona aware service and wherein at least one of the one or more applications are to be persona aware; and
    one or more virtual machines switchable by the application configuration module in response to identification of the specific user persona.

6. The apparatus according to claim 5, wherein the one or more user identification sensors include one or more of a radio frequency identification tag, a smart card, a factor authentication device, a biometric sensor, a face recognition sensor, and a behavioral biometric sensor.

7. The apparatus according to claim 5, wherein the application configuration module is to interface with a user specific storage.

8. The apparatus according to claim 5, wherein the application configuration module is to configure at least one of the one or more applications through an operating system.

9. A method comprising:
    monitoring a first user based on a signal from one or more user identification sensors;
    identifying a context aware user persona including a context in which the first user is operating employing at least one of the one or more user identification sensors; and
    configuring one or more applications on a computing machine for the first user wherein the configuring one or more applications includes switching between one or more virtual machines, wherein the configuring one or more applications includes accessing at least one of the one or more applications through a persona aware service.

10. The method according to claim 9, further including:
    identifying a second user employing at least one of the one or more user identification sensors;
    saving first application status information; and
    reconfiguring one or more of the applications for the second user.

11. The method according to claim 10, further including:
    identifying the first user employing at least one of the one or more user identification sensors;
    saving second application status information; and
    reconfiguring one or more of the applications for the first user using the first application status information.

12. The method according to claim 11, further including making a first user specific storage only available to the first user and making a second user specific storage only available to the second user.

13. The method according to claim 9, wherein the signal is received from one or more of a radio frequency identification tag, a smart card, a factor authentication device, a biometric sensor, a face recognition sensor, and a behavioral biometric sensor.

14. The method according to claim 9, wherein the configuring one or more applications includes accessing at least one of the one or more applications through an operating system.

15. At least one non-transitory machine-readable medium comprising one or more instructions which, if executed by a processor, cause a computer to:
monitor a first user using one or more user identification sensors;
identify a context aware user persona, including a context in which the first user is operating, employing at least one of the one or more user identification sensors; and
configure one or more applications on a computing machine for the first user wherein the configuring one or more applications includes switching between one or more virtual machines and accessing at least one of the one or more applications through a persona aware service to configure the one or more applications.

16. The medium according to claim 15, wherein the instructions, if executed, further cause a computer to:
identify a second user employing at least one of the one or more user identification sensors;
save first application status information; and
reconfigure one or more of the applications for the second user.

17. The medium according to claim 16, wherein the instructions, if executed, cause a computer to:
identify the first user employing at least one of the one or more user identification sensors;
save second application status information; and
reconfigure one or more of the applications for the first user using the first application status information.

18. The medium according to claim 15, wherein one or more of radio frequency identification tag, a smart card, a factor authentication device, a biometric sensor, a face recognition sensor, and a behavioral biometric sensor are to be used to monitor the first user.

19. The medium according to claim 15, wherein the instructions, if executed, cause a computer to access a user specific storage.

20. The medium according to claim 15, wherein the instructions, if executed, cause a computer to access at least one of the one or more applications through an operating system to configure the one or more applications.

* * * * *